United States Patent
Yeh et al.

(10) Patent No.: US 8,824,576 B2
(45) Date of Patent: Sep. 2, 2014

(54) METHOD AND TRANSMITTER FOR ITERATIVELY MODIFYING BEAMFORMING VECTOR

(75) Inventors: Choongil Yeh, Daejeon (KR); Dong Seung Kwon, Daejeon (KR); Ji Hyung Kim, Daejeon (KR); David Gesbert, Sophia-Antipolis (FR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 13/060,897

(22) PCT Filed: Aug. 6, 2009

(86) PCT No.: PCT/KR2009/004391
§ 371 (c)(1),
(2), (4) Date: Feb. 25, 2011

(87) PCT Pub. No.: WO2010/024539
PCT Pub. Date: Mar. 4, 2010

(65) Prior Publication Data
US 2011/0158347 A1    Jun. 30, 2011

(30) Foreign Application Priority Data

Aug. 26, 2008  (KR) ................. 10-2008-0083478
Jul. 13, 2009  (KR) ................. 10-2009-0063703

(51) Int. Cl.
*H04K 1/10*    (2006.01)
(52) U.S. Cl.
USPC ........... 375/260; 375/267; 375/299; 375/347; 455/101
(58) Field of Classification Search
None
See application file for complete search history.

(56) References Cited

U.S. PATENT DOCUMENTS

| | | |
|---|---|---|
| 7,907,912 B2 | 3/2011 | Nam et al. |
| 2004/0121810 A1 | 6/2004 | Goransson et al. |
| 2008/0039146 A1 | 2/2008 | Jin |
| 2008/0108390 A1 | 5/2008 | Yoon et al. |
| 2008/0232502 A1* | 9/2008 | Wild et al. ............. 375/267 |
| 2010/0020907 A1* | 1/2010 | Rezvani et al. .......... 375/347 |
| 2012/0076032 A1* | 3/2012 | Mundarath et al. ....... 370/252 |

FOREIGN PATENT DOCUMENTS

| | | |
|---|---|---|
| EP | 1191706 A2 | 3/2002 |
| KR | 10-2007-0052511 | 5/2007 |

OTHER PUBLICATIONS

Notification of Transmittal of the International Search Report and the Written Opinion of the International Searching Authority, dated Oct. 11, 2010 in connection with PCT Patent Application No. PCT/KR2009/004391.

Eduard A. Jorswieck, et al., "Complete Characterization of the Pareto Boundary for the MISO Interference Channel", IEEE Transactions on Signal Processing, vol. 56, No. 10, Oct. 2008, 6 pages.

* cited by examiner

Primary Examiner — Adolf Dsouza

(57) ABSTRACT

The present invention provides data transmission capacity that is optimized in a communication environment by iteratively modifying a beamforming vector by linearly coupling selfish beamforming with unselfish beamforming using feedback information. The transmitter for modifying the beamforming vector iteratively includes: a feedback receiving module that receives feedback information from a receiver: and a vector determination module that determines an initial beamforming vector by coupling a first vector for the selfish beamforming with a second vector for the unselfish beamforming at the time of initial beamforming, and corrects a coupling ratio of the first vector and the second vector of the beamforming vector with reference to the received feedback information whenever the beamforming is modified.

17 Claims, 2 Drawing Sheets

METHOD AND TRANSMITTER FOR ITERATIVELY MODIFYING BEAMFORMING VECTOR

CROSS-REFERENCE TO RELATED APPLICATION(S)

The present application claims priority under 35 U.S.C. §365 to International Patent Application No. PCT/KR2009/004391 filed Aug. 6, 2009, entitled "METHOD AND TRANSMITTER FOR ITERATIVELY MODIFYING BEAMFORMING VECTOR". International Patent Application No. PCT/KR2009/004391 claims priority under 35 U.S.C. §365 and/or 35 U.S.C. §119(a) to Korean Patent Application No. 10-2008-0083478 filed Aug. 26, 2008 and Korean Patent Application No. 10-2009-0063703 filed Jul. 13, 2009, and which are incorporated herein by reference into the present disclosure as if fully set forth herein.

TECHNICAL FIELD

An exemplary embodiment of the present invention relates to a transmitter that provides data transmission capacity that is optimized in a communication environment by iteratively modifying a beamforming vector linearly by coupling selfish beamforming with unselfish beamforming using feedback information, and a method for iteratively modifying a beamforming vector.

BACKGROUND ART

A multiple access system uses a beamforming (BF) technique using multiple antennas for improvement in performance of the system and an increase in capacity. Generally, beamforming represents that a plurality of antennas areis disposed at predetermined intervals, and weighting vectors given for each antenna for the same signal are multiplied and transmitted.

In order to obtain an optimum weighting vector for each antenna, a zero forcing (ZF) algorithm can be used. The zero forcing algorithm, which removes an interference signal by previously multiplying a transmitting signal by an inverse matrix of a channel at the time of transmission, performs beamforming so as to not generate interference in another transmitter rather than concentrating power on an object receiving information, such that it is regarded as an unselfish algorithm.

To the contrary, a maximal ratio transmission (MRT) algorithm performs beamforming in order for power to be concentrated only in the direction of a specific transmitter, not considering interference affecting another receiver, such that it is regarded as selfish algorithm.

Therefore, in the communication environment having a good channel condition, high transmission efficiency can be expected when the selfish algorithm such as the maximal ratio transmission beamforming is used, and in the communication environment having a bad channel condition, high transmission efficiency can be expected when the unselfish algorithm such as the zero forcing beamforming is used.

However, since the channel condition is variable according to time, there is a demand for properly coupling and applying the selfish algorithm and the unselfish algorithm according to the channel condition for obtaining optimum transmission efficiency.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

An exemplary embodiment of the present invention provides a method for providing a beamforming vector coupling a selfish algorithm with an unselfish algorithm and modifying the beamforming vector iteratively using feedback information, and a transmitter thereof.

Solution to Problem

In order to accomplish the objects, an exemplary embodiment of the present invention provides a transmitter that simultaneously supports first beamforming considering interference between channels and second beamforming not considering interference between channels, including: a feedback receiving module that receives feedback information from a receiver; and a vector determination module that determines an initial beamforming vector by coupling a first vector for the first beamforming with a second vector for the second beamforming at the time of the initial beamforming, and modifies a coupling ratio of the first vector and the second vector of the beamforming vector with reference to the received feedback information from the following beamforming.

Another embodiment of the present invention provides a method for iteratively modifying a beamforming vector of a transmitter that simultaneously supports first beamforming considering interference between channels and second beamforming not considering interference between channels, including: receiving feedback information from a receiver; and determining a beamforming vector that couples a first vector for the first beamforming with a second vector for the second beamforming using the feedback information at the time of initial beamforming; and correcting a coupling ratio of the first vector and the second vector of the beamforming vector determined using the received feedback information at the time of iteration of following beamforming.

In the two embodiments of the present invention, the feedback information may include channel information, and the vector determination module may determine the initial beamforming vector using the channel information.

Further, the feedback information may include speed increase/decrease information, and the vector determination module may modify the beamforming vector using the speed increase/decrease information.

In addition, the feedback information may include iteration stopping information, and the vector determination module may fix the beamforming vector that is previously determined as it is when the iteration stopping information is received.

Advantageous Effects of Invention

With the exemplary embodiment of the present invention, the coupling ratio of the selfish beamforming and the unselfish beamforming may be operated in a variable manner using the feedback channel information or data transmission information, making it possible to secure the maximum data transmission capacity in a given channel condition.

BEST MODE FOR CARRYING OUT THE INVENTION

Figure 1:
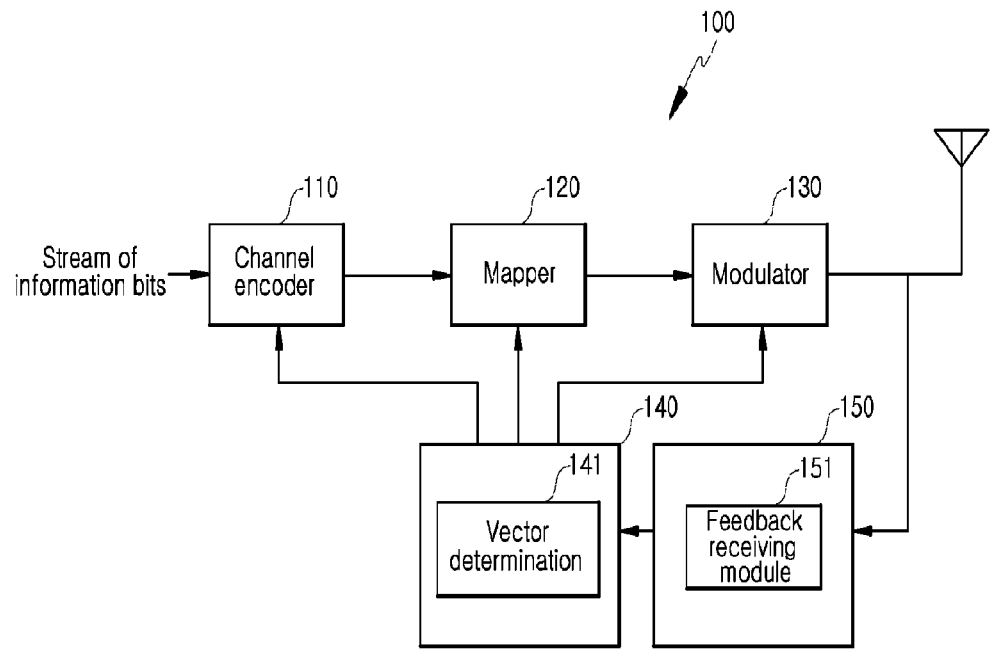
FIG. 1 is a block diagram schematically illustrating a structure of a transmitter according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Generally, a communication system includes a transmitter and a receiver. Herein, the transmitter and the receiver may be referred to as a transceiver that performs both a transmission function and a receiving function. In the present specification, one side to perform data transmission through beamforming will be referred to as the transmitter, and the other side to transmit feedback information to the transmitter will be referred to as the receiver. In the downlink channel, the transmitter may be a transmitter and the receiver may be a receiver.

In the specification, unselfish beamforming that is performed to not generate interference in the receiver rather than concentrating power on an object receiving information will be referred to as first beamforming, and selfish beamforming that concentrates power only in a specific receiver, not considering interference affecting the receiver, will be referred to as second beamforming.

For convenience of explanation, in an exemplary embodiment, zero forming (hereinafter referred to as "ZF") beamforming will be described by way of example of the first beamforming, and maximal ratio transmission (hereinafter referred to as "MRT") beamforming will be described by way of example of the second beamforming.

FIG. 1 is a block diagram schematically illustrating a structure of a transmitter according to an exemplary embodiment of the present invention.

Referring to FIG. 1, the transmitter 100 includes a channel encoder 110, a mapper 120, a modulator 130, a controller 140, and a receive circuit 150.

The channel encoder 110 receives a predetermined stream of information bits and encodes them according to a predetermined coding scheme, thereby forming coded data. The stream of information bits may include text, voice, image, or other data.

The mapper 120 modulates coded data of the stream of information bits according to a predetermined modulation scheme to provide transmission symbols. The coded data are mapped as symbols indicating positions according to amplitude and phase constellation by the mapper 120.

The modulator 130 modulates the transmission symbols according to a multiple access modulation scheme. There is no limitation in the multiple access modulation scheme, and a single-carrier modulation scheme such as well-known CDMA or a multi-carrier modulation scheme such as OFDM may be adopted.

The receive circuit 150 receives a signal transmitted from the receiver through an antenna and digitalizes and transmits it to the controller 150. The receive circuit 150 includes a feedback receive module 151 that processes various information that is fed back from the receiver. The information extracted from the signal received in the feedback receive module 161 may include channel status information (CSI), speed increase/decrease information, and iteration stopping information.

The channel status information is information of which the receiver feeds backs a channel environment, a coding scheme, or a modulation scheme to the transmitter 100, wherein a channel quality indicator (CQI) may be provided by way of example.

The speed increase/decrease information is information that represents whether data transmission speed allocated to the receiver is increased or decreased whenever the beamforming vector is modified. In view of the reduction of feedback overhead, it is exemplary that the speed increase/decrease information is implemented as 1 bit or 2 bit small information content.

The iteration stopping information is information that requests to stop modification of the beamforming vector and fix the current beamforming vector when the transmission speed allocated to the receiver is reduced by the modification of the beamforming vector. The iteration stopping information may be operated separately from the speed increase/decrease information, and may also be operated to understand "speed decrease" in the speed increase/decrease information as an iteration stopping request.

The controller 140 controls the entire operation of the transmitter 100 and, particularly, includes a vector determination module 141 that determines the beamforming vector for transmitting data.

The transmitter according to an exemplary embodiment of the present invention simultaneously supports the first beamforming and the second beamforming, while it uses a beamforming vector linearly coupling a first vector for the first beamforming and a second vector for the second beamforming.

The vector determination module 141 determines an initial beamforming vector using the feedback information from the receiver, and iteratively modifies a coupling ratio of the first vector and the second vector of the determined beamforming vector with reference to the received feedback information from the following beamforming.

In other words, the vector determination module 141 gradually corrects the beamforming vector with reference to the feedback information in order to increase the downlink channel transmission speed for receivers belonging to the same service area. For example, when the transmitter starts an initial beamforming using MRT beamforming, it thereafter performs the beamforming by linearly coupling ZF beamforming and MRT beamforming. At this time, it may be corrected so that the ratio of the MRT beamforming is gradually decreased and the ratio of the ZF beamforming is gradually increased whenever the beamforming is iterated.

Hereinafter, the process of determining the initial beamforming vector will be described using equations.

The vector determination module 141 determines the initial beamforming vector using channel status information of the feedback information from the receiver.

Generally, in a channel having a high signal to noise ratio (SNR), the performance of the MRT beamforming is much better than the performance of the ZF beamforming, and in the channel having a low SNR, the performance of the ZF beamforming is much better than the performance of the MRT beamforming. Therefore, the vector determination module 141 may determine the initial beamforming vector through a policy shown in Equation 1.

$$w_i(0) = \begin{cases} w_i^{ZF} & \text{if } R^{ZF} > R^{MRT} \\ w_i^{MRT} & \text{otherwise} \end{cases} \quad \text{[Equation 1]}$$

$$R^{ZF} = \sum_{k=1}^{M} \log_2\left(1 + \frac{|h_{ii}w_i^{ZF}|^2}{\sum_{\substack{k=1\\k\neq i}}^{M}|h_{ki}w_k^{ZF}|^2 + \sigma_n^2}\right)$$

$$R^{MRT} = \sum_{k=1}^{M} \log_2\left(1 + \frac{|h_{ii}w_i^{MRT}|^2}{\sum_{\substack{k=1\\k\neq i}}^{M}|h_{ki}w_k^{MRT}|^2 + \sigma_n^2}\right)$$

Herein, $w_i(O)$ represents a beamforming vector when the transmitter uses in an $i^{th}$ receiver, $R^{ZF}$ represents channel interference when using ZF beamforming, and $R^{MRT}$ represents channel interference when using MRT beamforming, respectively, represents a channel status between a transmitter k and a receiver I, and $h_{ki}$ and $\sigma_n^2$ represent variance for obtaining additive white Gaussian noise (AWGN).

Herein, when the MRT beamforming vector is determined as the initial beamforming vector, the MRT beamforming vector will be described using equations.

First, if the number of transmitting antennas provided in each transmitter is Nt and the number of receiving antennas provided in each receiver is $N_r$ in a wireless network, channel status information (H) may be represented by Equation 2.

$$H_{ki} \in C^{N_r \times N_t} \quad \text{[Equation 2]}$$

In Equation 2, k represents an index of a transmitter and i represents an index of a receiver.

In the case of $N_r=1$, Equation 1 may be represented by Equation 3 using a vector.

$$h_{ki} \in C^{1 \times N_t} \quad \text{[Equation 3]}$$

In an exemplary embodiment of the present invention, it is assumed that the channel information measured by the receiver is not fed back to all transmitters in order to reduce feedback overhead, but is fed back to only a serving transmitter.

If a beamforming vector that is used to an $i^{th}$ receiver by a transmitter k in a $j^{th}$ beamforming iteration is $w_{ki}(j)$, an initial value of the MRT beamforming vector is represented by Equation 4.

$$w_{ki}(0) = w_{ki}^{MRT} \quad \text{[Equation 4]}$$

Assuming that only one receiver exists for each cell, the initial beamforming vector for the MRT beamforming may be represented by Equation 5.

$$w_k^{MRT} = \frac{h_k^+}{\|h_k\|} \quad \text{[Equation 5]}$$

In Equation 5, + represents a complex conjugate transpose.

Next, a process of correcting the beamforming vector iteratively based on feedback information after the initial beamforming vector is determined will be described.

The receiver calculates data transmission speed that may be allocated to itself whenever the modification of the beamforming vector is iterated, and feeds back speed increase/decrease information representing whether the calculated speed is increased or decreased compared to speed at the time of iteration made right before, to the transmitter.

Herein, assuming that the number of base stations using the same frequency is M and propagation loss may be ignored, the data transmission speed that may be obtained by a terminal belonging to a base station i in a $j^{th}$ iteration will be represented by Equation 6.

$$r_i(j) = \log_2\left(1 + \frac{|h_{ii}w_i(j)|^2}{\sum_{\substack{k=1\\k\neq i}}^{M}|h_{ki}w_k(j)|^2 + \sigma_n^2}\right) \quad \text{[Equation 6]}$$

The transmitter refers to the speed increase/decrease information that is fed back by the receiver before modifying the beamforming vector. In other words, if the transmitter is informed by the receiver of "speed increase" for the $j^{th}$ iteration where the ratio of the second beamforming vector is increased, and it further increases the ratio of the second beamforming vector in a $j+1^{st}$ iteration. To the contrary, if the transmitter is informed by the receiver of "speed decrease", it decreases the ratio of the second beamforming vector in the $j+1^{st}$ iteration.

Generally, the beamforming vector used in the $j^{th}$ iteration may be represented by Equation 7.

$$w_k(j) = w_k(j-1) + \delta_w(j) \quad \text{[Equation 7]}$$

$$w_k(j) = \frac{w_k(j)}{\|w_k(j)\|}$$

In Equation 7, $\delta_w(j)$ is a predetermined constant, and is calculated using the channel status information of information that is fed back from the receiver.

At this time, the modification of the beamforming vector may be divided into the following cases according to the kind of the first beamforming vector and the second beamforming vector.

First, there is provided a case where the MRT beamforming vector is coupled with the ZF beamforming vector.

The vector determination module 141 may determine either one of the MRT beamforming vector and the ZF beamforming vector as the initial beamforming vector. Generally, when starting with the MRT beamforming, it may be modified in an aspect of a zero forcing increment made gradually whenever the beamforming is iterated, whereas when starting with the ZF beamforming, it may be modified in an aspect of a maximum ratio transferring increment whenever the beamforming is iterated. When using a numerical formula, these may be represented by Equation 8.

$$w_i(j+1) = w_i(j) + \alpha_i w_i^{ZF}$$

$$w_i(j+1) = w_i(j) + \alpha_i w_i^{MRT} \quad \text{[Equation 8]}$$

Second, there is provided a case where the ZF beamforming vector is coupled with an orthogonal ZF beamforming vector.

The vector determination module 141 may determine either one of the ZF beamforming vector and the orthogonal ZF beamforming vector as the initial beamforming vector.

Generally, when starting with the ZF beamforming, it may be modified in an aspect of an orthogonal zero forcing increment made gradually whenever the beamforming is iterated, whereas when starting with the orthogonal ZF beamforming, it may be modified in an aspect of a zero forcing increment whenever the beamforming is iterated.

Herein, the ZF beamforming vector may be obtained using Equation 9, and the orthogonal ZF beamforming vector may be obtained using Equation 10.

$$w_i^{ZF} = \frac{\Pi_{H_{-1}}^\perp h_{ii}^+}{|\Pi_{H_{-1}}^\perp h_{ii}^+|} \quad \text{[Equation 9]}$$

$$\Pi_{H_{-1}}^\perp = I - H_{-i}(H_{-i}^H H_{-i})^{-1} H_{-i}^H$$

$$\Pi_{H_{-1}} = H_{-i}(H_{-i}^H H_{-i})^{-1} H_{-i}^H$$

$$H_{-i} = [h_{i1}^T, \ldots, h_{i(i-1)}^T, h_{i(i+1)}^T, \ldots, h_{iM}^T]$$

$$w_i^{\perp ZF} = \frac{\Pi_{H_{-1}^\perp}^\perp h_{ii}^+}{|\Pi_{H_{-1}^\perp}^\perp h_{ii}^+|} \quad \text{[Equation 10]}$$

Further, the modification of the beamforming vector performed whenever the beamforming is iterated may be represented by Equation 11.

$$w_i(j) = \sqrt{\beta_i(j)}\, w_i^{\perp ZF} + \sqrt{1 - \beta_i(j)}\, w_i^{ZF} \quad \text{[Equation 11]}$$

$$0 \le \beta_i(j) \le \tilde{\beta}_i$$

$$L_1 = |\Pi_{H_{-1}} h_{ii}|^2,\ L_2 = |\Pi_{H_{-1}}^\perp h_{ii}|^2,\ \tilde{\beta}_i = \frac{L_1}{L_1 + L_2}$$

$$\beta_i(0) = \begin{cases} \tilde{\beta}, & R^{MRC} > R^{ZF} \\ 0, & \text{otherwise} \end{cases}$$

$$\beta_i(j+1) = \begin{cases} \beta_i(j) - \delta_\beta, & R^{MRC} > R^{ZF} \\ \beta_i(j) - \delta_\beta, & \text{otherwise} \end{cases}$$

$\delta_\beta$ is predetermined constant

Meanwhile, when the iteration stopping information is received from the receiver, the vector determination module 141 stops further modification of the beamforming vector and maintains the current beamforming vector as it is. To this end, the receiver calculates data transmission speed that may be allocated to itself whenever the modification of the beamforming vector is iterated, and transmits the iteration stopping information to the transmitter when the calculated speed is decreased compared to the speed at the time of iteration made right before. The speed increase/decrease information may be used as the iteration stopping information, as aforementioned.

Next, a method in which the above-described transmitter iteratively modifies the beamforming vector will be described.

Figure 2:
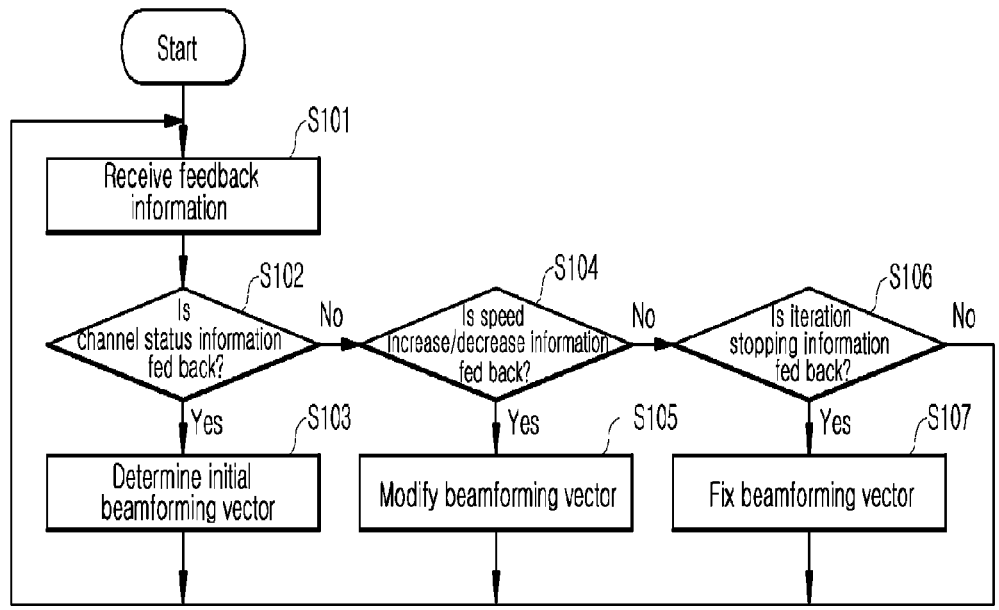
FIG. 2 is a flowchart sequentially illustrating a method for modifying a beamforming vector according to an exemplary embodiment of the present invention.

FIG. 2 is a flowchart sequentially illustrating a method for modifying a beamforming vector according to an exemplary embodiment of the present invention.

If feedback information (S101) received from a receiver is channel status information (S102), a transmitter linearly couples a first beamforming vector with a second beamforming vector, considering a channel status, to determine an initial beamforming vector (S103). Generally, it is exemplary that the first beamforming vector is determined as the initial beamforming vector in a low SNR channel and the second beamforming vector is determined as the initial beamforming vector in a high SNR channel.

Thereafter, if speed increase/decrease information is fed back from the receiver (S104), the transmitter determines a following beamforming vector according to whether speed is increased or decreased (S105). For example, when the ratio of the second beamforming vector is increased in the modification of the former beamforming vector, the ratio of the second beamforming vector is further increased in this modification when being informed by the receiver of "speed increase". To the contrary, the ratio of the second beamforming vector is decreased when being informed by the receiver of "speed decrease".

If iteration stopping information is fed back from the receiver (S106), the transmitter stops further modification of the beamforming vector and continuously maintains the beamforming vector that is previously determined (S107).

As described above, the case where the beamforming vector is determined using the feedback information is explained. However, when using reversible channel characteristics in a time division duplex (TDD) scheme, the beamforming vector can be modified iteratively without using the feedback information.

In the TDD scheme, the optimum coupling ratio of the first beamforming vector and the second beamforming vector can be obtained using a virtual signal to interference plus noise ratio (SINR).

Figure 3:
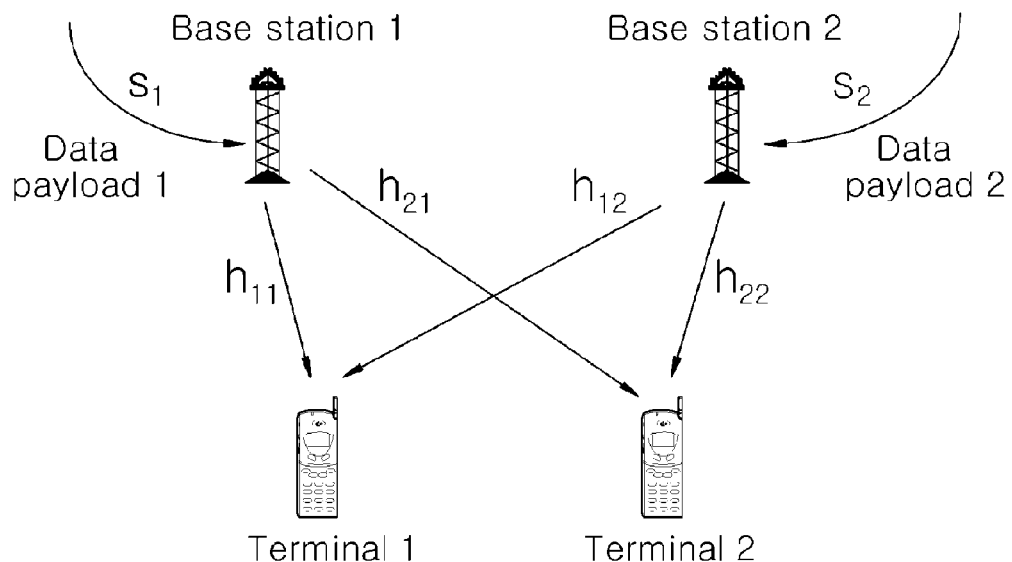
FIG. 3 is a layout view of a base station and a terminal for obtaining a virtual downlink signal-to-interference plus noise ratio (SINR).

FIG. 3 is a layout view of a base station and a terminal for obtaining a virtual downlink SINR.

Referring to FIG. 3, a downlink SINR of a terminal 1 may be obtained by Equation 12, $$\frac{|h_{11}w_1|^2}{\frac{\sigma^2}{P} + |h_{12}w_2|^2} \quad \text{[Equation 12]}$$

wherein P that is the virtual downlink SINR of a power the terminal 1 may be defined by Equation 13.

$$SINR_{DL}^{true} = \frac{|h_{11}w_1|^2}{\frac{\sigma_{MS1}^2}{P_{BS1}} + \frac{P_{BS2}}{P_{BS1}}|h_{12}w_2|^2} = \frac{|h_{11}w_1|^2}{\frac{\sigma^2}{P} + |h_{12}w_2|^2} \quad \text{[Equation 13]}$$

Figure 4:
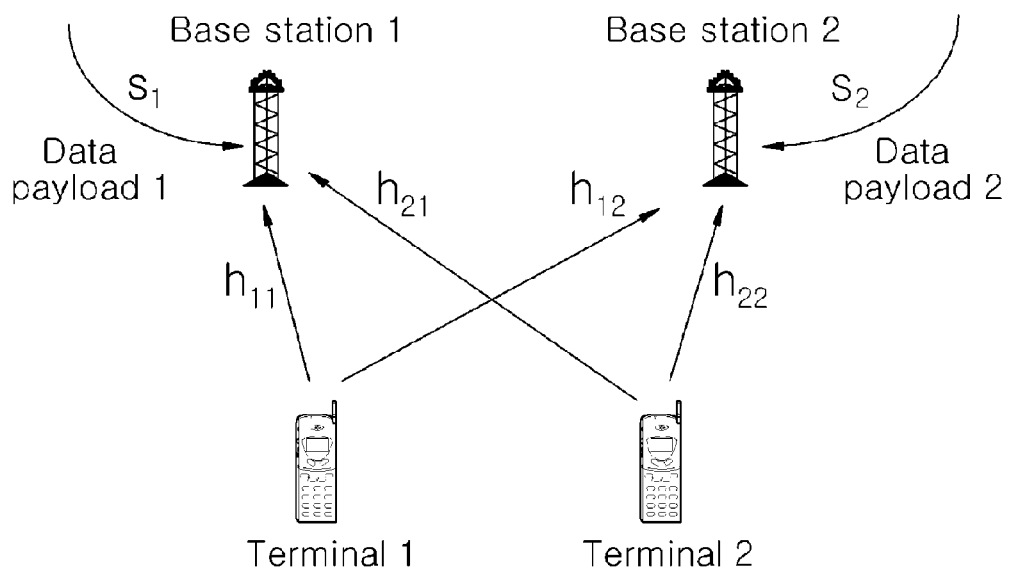
FIG. 4 is a layout view of a base station and a terminal for obtaining a virtual uplink SINR.

Referring to FIG. 4, an uplink SINR of the terminal 1 may be obtained by Equation 14.

$$\frac{|h_{11}w_1|^2}{\frac{\sigma^2}{P} + |h_{21}w_1|^2} \quad \text{[Equation 14]}$$

A virtual uplink SINR of the terminal 1 may be defined by Equation 15.

$$SINR_{UL}^{true} = \frac{|h_{11}w_1|^2}{\frac{\sigma_{BS1}^2}{P_{MS1}} + \frac{P_{MS2}}{P_{MS1}}|h_{21}w_1|^2} = \frac{|h_{11}w_1|^2}{\frac{\sigma^2}{P} + |h_{21}w_1|^2} \quad \text{[Equation 15]}$$

Herein, a base station 1 may obtain a beamforming vector as shown in Equation 16 in order to have a maximum data transmission capacity in view of the entire system.

$$w_1 = \arg\max_{\|w\|^2=1} \frac{w^H h_{11}^H h_{11} w}{w^H \left[\frac{\sigma^2}{P} + h_{12}^H h_{12}\right] w} \quad \text{[Equation 16]}$$

A base station 2 may obtain a beamforming vector as shown in Equation 17 in order to have a maximum data transmission capacity in view of the entire system.

$$w_2 = \arg\max_{\|w\|^2=1} \frac{w^H h_{22}^H h_{22} w}{w^H \left[\frac{\sigma^2}{P} + h_{21}^H h_{21}\right] w} \quad \text{[Equation 17]}$$

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitter that supports first beamforming that considers interference between channels and second beamforming that does not consider interference between channels, the transmitter comprising:
a feedback receiving module configured to receive feedback information from a receiver, wherein the feedback information includes iteration stopping information; and
a vector determination module configured to determine an initial beamforming vector by coupling a first vector for the first beamforming with a second vector for the second beamforming, modify a coupling ratio of the first vector and the second vector of the beamforming vector based on the received feedback information, and maintain the beamforming vector in response to the iteration stopping information being received.

2. The transmitter of claim 1, wherein
the feedback information includes channel information, and
the vector determination module is further configured to determine the initial beamforming vector based on the channel information.

3. The transmitter of claim 2, wherein
the feedback information includes speed change information, and
the vector determination module is further configured to modify the beamforming vector based on the speed change information.

4. The transmitter of claim 1, wherein
a zero forcing beamforming vector is used as the first vector, and a maximal ratio transmission beamforming vector is used as the second vector.

5. A method for iteratively modifying a beamforming vector of a transmitter that supports first beamforming that considers interference between channels and second beamforming that does not consider interference between channels, the method comprising:
receiving feedback information from a receiver;
determining a beamforming vector that couples a first vector for the first beamforming with a second vector for the second beamforming using feedback information during initial beamforming;
modifying a coupling ratio of the first vector and the second vector of the beamforming vector determined based on the received feedback information; and
maintaining the beamforming vector in response to iteration stopping information being received, wherein the iteration stopping information is included in the feedback information.

6. The method of claim 5, wherein:
the feedback information includes channel status information; and
the beamforming vector is determined during the initial beamforming based on the channel status information.

7. The method of claim 6, wherein:
the feedback information includes speed change information; and
modifying the coupling ratio of the first vector and the second vector of the beamforming vector comprises modifying the beamforming vector based on the speed change information.

8. The method of claim 5, wherein a zero forcing (ZF) beamforming vector is used as the first vector, and an orthogonal zero forcing beamforming vector is used as the second vector.

9. The method of claim 5, wherein a zero forcing (ZF) beamforming vector is used as the first vector, and a maximal ratio transmission (MRT) beamforming vector is used as the second vector.

10. The method of claim 5, wherein modifying the coupling ratio of the first vector and the second vector of the beamforming vector comprises:

modifying the beamforming vector based on a first increment associated with the first beamforming when the beamforming vector was initially determined based on the second beamforming; and modifying the beamforming vector based on a second increment associated with the second beamforming when the beamforming vector was initially determined based on the first beamforming.

11. The method of claim 5, wherein modifying the coupling ratio of the first vector and the second vector of the beamforming vector comprises determining an optimum coupling ratio based on a virtual SINR (signal to interference plus noise ratio).

12. An apparatus that supports a first beamforming scheme that considers interference between channels and a second beamforming scheme that does not consider interference between channels, the apparatus comprising:

a feedback receiving module configured to receive feedback information from a receiver, wherein the feedback information includes iteration stopping information; and a vector determination module configured to initially determine a beamforming vector comprising a coupling of a first vector of the first beamforming scheme and a second vector of the second beamforming scheme, modify the beamforming vector based on the received feedback information by adjusting a coupling ratio of the first vector and the second vector, and maintain the beamforming vector in response to the iteration stopping information being received.

13. The apparatus of claim 12, wherein the feedback information includes channel information, and the vector determination module is further configured to initially determine the beamforming vector based on the channel information.

14. The apparatus of claim 12, wherein the feedback information includes transmission rate change information, and the vector determination module is further configured to modify the beamforming vector based on the transmission rate change information.

15. The apparatus of claim 12, wherein a zero forcing beamforming vector is used as the first vector, and a maximal ratio transmission beamforming vector is used as the second vector.

16. The apparatus of claim 12, wherein in modifying the beamforming vector, the vector determination module is further configured to:

when the first vector is initially determined as the beamforming vector, adjust the first vector of the beamforming vector by a first increment; and when the second vector is initially determined as the beamforming vector, adjust the second vector of the beamforming vector by a second increment.

17. The apparatus of claim 12, wherein in adjusting the coupling ratio of the first vector and the second vector of the beamforming vector, the vector determination module is further configured to determine an optimum coupling ratio based on a virtual SINR (signal to interference plus noise ratio).

* * * * *